(12) United States Patent
Masuzawa et al.

(10) Patent No.: US 6,313,554 B1
(45) Date of Patent: Nov. 6, 2001

(54) DISKETTE INCORPORATING PERMANENT MAGNET GENERATOR WITH LOW LEAKAGE FLUX

(75) Inventors: Masahiro Masuzawa, Fukaya; Fumio Kimura, Gyoda; Toshiko Takahashi; Masahiro Mita, both of Fukaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/449,465

(22) Filed: Nov. 29, 1999

(30) Foreign Application Priority Data

Nov. 27, 1998 (JP) .................................................. 10-336673
Nov. 27, 1998 (JP) .................................................. 10-336674

(51) Int. Cl.$^7$ ............................ H02K 11/00; H02K 5/00; H02K 21/12; H02K 1/12; H02K 1/27
(52) U.S. Cl. .................................. 310/67 R; 310/40 MM; 310/89; 310/156.01; 310/254; 310/261
(58) Field of Search ............................ 310/67 R, 40 MM, 310/46, 47, 48, 50, 66, 68 R, 89, 85, 112, 114, 152, 156.01, 156.26, 179, 180, 184, 193, 254, 261, 267, 264, DIG. 6

(56) References Cited

U.S. PATENT DOCUMENTS 5,041,924 * 8/1991 Blackborow et al. ................. 360/69
5,159,182    10/1992 Eisele et al. .

FOREIGN PATENT DOCUMENTS 7-500238   1/1995 (JP) .
7-86912    9/1995 (JP) .

* cited by examiner

Primary Examiner—Nestor Ramirez
Assistant Examiner—Guillermo Perez
(74) Attorney, Agent, or Firm—Sughrue, Mion, Zinn, Macpeak & Seas, PLLC

(57) ABSTRACT

In a diskette, such as a 3.5" floppy disk, having adjoiningly a permanent magnet generator and a space for inserting a memory card with a magnetic stripe, the affection of leakage magnetic flux from the generator permanent magnet to the memory card and another floppy disk that may be put in the neighborhood of the diskette is substantially eliminated and the generator output is increased. A magnetic shield is disposed only at the portion corresponding to the magnetic stripe of the memory card on a generator housing or a partition between the generator permanent magnet and the memory card space. A magnetic shield ring with a diameter substantially equal to or larger than the outside diameter of the permanent magnet is fixed or pasted on one side end of the rotor permanent magnet adjacent to one of the ends of the diskette case.

25 Claims, 11 Drawing Sheets

FIG. IA
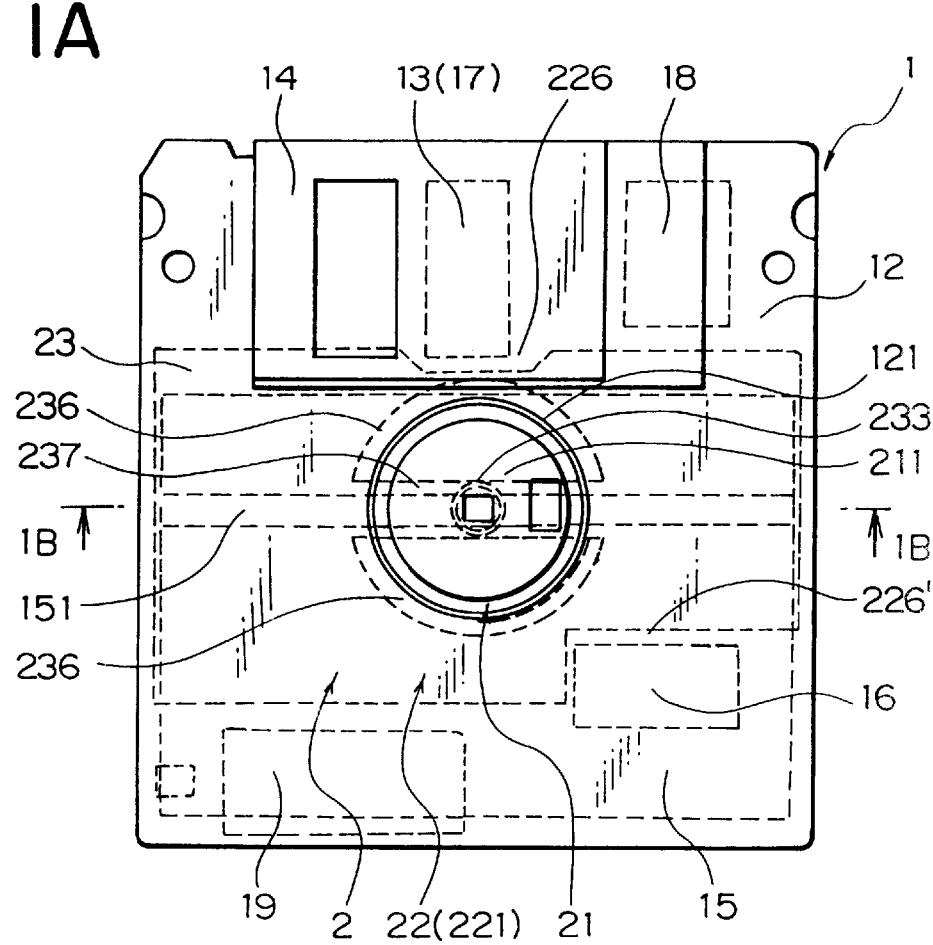
FIG. IB
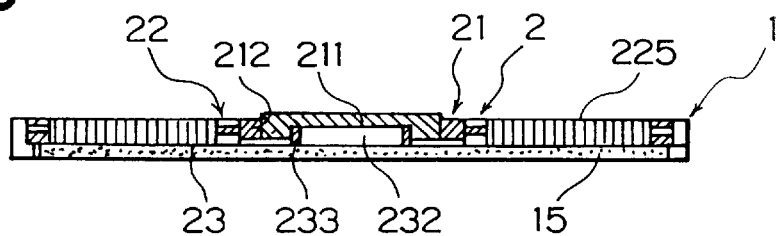
FIG. IC
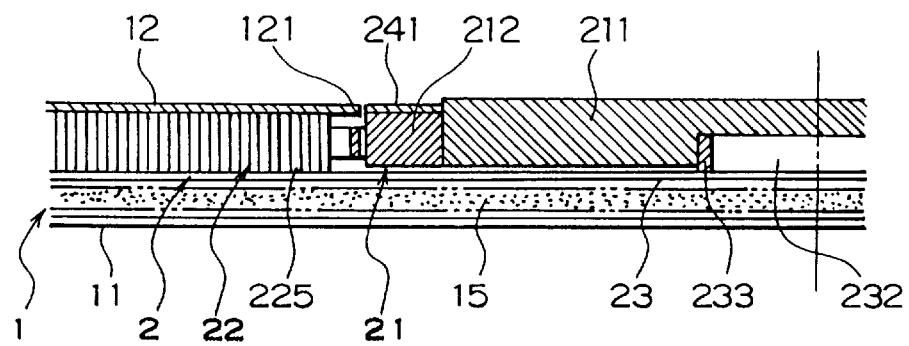

DISKETTE INCORPORATING PERMANENT MAGNET GENERATOR WITH LOW LEAKAGE FLUX

FIELD OF THE INVENTION

The present invention relates generally to a diskette incorporating a permanent magnet generator, and more particularly to a diskette incorporating a permanent magnet generator that can be inserted into a floppy disk drive, and when a memory is installed in the diskette, serves as a power source for the memory to input and output data in the memory.

DESCRIPTION OF THE RELATED ART

Medical information, such as personal medical checkup results, is stored in an IC card, from which medical institutions can retrieve such information for use in the treatment of the patient, and can store the contents of his case records in the card. Plans are also now under way to use IC cards as electronic cash. Under the plans, data on a customer's bank account, password, and his bank balance, if necessary, are stored in an IC card, by means of which payment is made on-line every time the customer buys a product.

It has been proposed that an enormous amount of video information handled by a digital camera should be stored in a flash memory that has a capacity as large as a couple of megabytes to 10 megabytes. A flash memory in which the video information is taken by a digital camera can be connected to a personal computer for subsequent video processing. The use of a flash memory to record the video information taken by a digital camera may eliminate an additional external memory unit, such as MOs.

The widespread use of IC cards or flash memories, as discussed above, has been deterred by the need for special input/output (I/O) devices dedicated for such media. Since most commonly used I/O devices for personal computers are floppy disk drives, particularly 3.5" floppy disk drives, the use of 3.5" floppy disks as an I/O device for IC cards and flash memories could spur their proliferation. In fact, adapters that can be inserted or incorporated in 3.5" floppy disk drives have already been proposed. A conventional type of 3.5" floppy disk drive has a magnetic head to read and write information from and into a 3.5" diskette and a drive shaft to cause the diskette to rotate at 300 rpm, but it has no power feeding terminals. In diskette-shaped adapters, as discussed above, a button battery is incorporated as a power source for the built-in CPU. A battery, which depletes as it is used, has to be replaced with a new one every four to five months at the longest.

Introduction of a 3.5" floppy disk in which a generator is incorporated and driven by the rotation of the drive shaft of the 3.5" floppy disk drive would prove very useful, giving momentum to the proliferation of IC cards and similar media. In fact, the concept of incorporating a generator in a 3.5" diskette has already been proposed in Published Examined Japanese Patent Application No. Hei-7(1995)-86912 and Tokuhyo Hei-7(1995)-500238, the published Japanese translation of PCT international publication for patent application.

Published Examined Japanese Patent Application No. Hei-7(1995)-86912 discloses that a generator is incorporated in a 3.5" diskette, and that the generator has a rotor, a stator and a regulator, but its detailed construction is not disclosed. Tokuhyo Hei-7(1995)-500238 discloses a generator incorporated in a 3.5" diskette having a permanent magnet that rotates with a hub, which is caused to rotate by the drive shaft of a floppy disk drive. This permanent magnet is of a cylindrical shape, magnetized in the axial direction so that multiple magnetic poles are provided on the end face of the cylinder. The magnetic poles of a stator yoke are disposed in such a manner as to sandwich the cylindrical permanent magnet, and a stator coil is provided between the stator yokes on both sides of the cylindrical permanent magnet. Another example is also disclosed in which magnetic poles are provided on the circumferential surface of the cylindrical permanent magnet. In this example, the magnetic poles of the stator yoke are of a claw pole shape.

In this way, these documents state a permanent magnet type generator incorporated in a 3.5" diskette, but it is unknown how much output can be produced with such a generator because they do not disclose the material of permanent magnet suitable for use in such a generator, and the detailed construction of the rotor and stator.

Now, let us consider a permanent magnet generator of a size that can be incorporate in a 3.5" floppy disk, as disclosed in Tokuhyo Hei-7(1995)500238, where the cylindrical permanent magnet is magnetized in such a manner that multiple magnetic poles are provided on the end face of the cylinder. In this case, stator magnetic poles are disposed on both sides of the cylinder end face via small magnetic gaps. Since the allowable thickness of a generator in a diskette is 2.0 to 2.5 mm, the thickness of the permanent magnet is only 0.5 to 0.8 mm at most. Even when a material having a large coercive force is used for a magnet with such a short distance between magnetic poles, only a small magnetomotive force can be expected. Even if magnetomotive force is increased by increasing the thickness of the magnet, the allowable thickness of the stator magnetic poles is reduced, making it difficult to pass sufficient magnetic flux in them.

In a permanent magnet generator where magnetic poles are provided on the circumferential surface of the cylindrical permanent magnet and the claw pole type stator yoke is provided, as disclosed in Tokuhyo Hei-7(1995)-500238, the end yoke of both claw pole type magnetic poles is provided facing each other within the allowable thickness of 2.0 to 2.5 mm for the generator, and a stator winding is provided between the end yoke. A sufficient number of winding turns cannot be provided within the allowable length of no more than 1 mm for the stator winding. Thus, a generator having a low output voltage would result.

In order to realize a generator having as high an output as possible and as low distortion as possible, it is necessary to dispose rotor magnetic poles on the circumferential surface of the cylindrical permanent magnet at equal angular intervals, make the number of magnetic poles of the stator yokes equal to the number of magnetic poles of the rotor permanent magnet, and dispose the stator magnetic poles facing the permanent magnet magnetic poles via magnetic gaps of substantially the same size. A diskette is required to have a space for inserting a memory card, to transfer information from and/or to the memory card with a magnetic stripe, such as an IC card. The size of a memory card is usually of 85 mm long, 54 mm wide and 0.8 mm thick, ignoring its embossed characters. When a space for the memory card is installed in the diskette with a permanent magnet generator, the space for inserting the memory card overlaps the generator and the generator thickness must be less than 2 mm, since a margin for insertion and removal of the memory card is needed other than two end plates (each thickness is 0.2 mm) of the diskette case and the memory card (thickness is 0.8 mm) within the thickness of 3.5 mm of the 3.5" diskette.

When a permanent magnet generator is installed to adjoin a memory card space in the diskette, magnetic flux from the permanent magnet of the generator leaks to the magnetic stripe on the memory card and affects the magnetic stripe to erase information in it or to misread. To prevent the flux leakage to the memory card space, it is necessary to install a magnetic shield plate, such as soft magnetic material of 0.2 mm or less thick, between the permanent magnet generator and the memory card space. For example, the housing of the generator is required to be made of soft magnetic plates. As a magnetic shield plate for preventing the leakage, a magnetic shied covering the whole plane to magnetically shield and without a hole is usually used. When a generator housing of 0.1 mm thick cold-rolled steel sheet is placed between a generator and a memory card space, the leakage magnetic flux in the memory card space becomes less than 10 Gausses, or reduces to less than 2% compared with 500 Gausses on no shield plate, and even a thin shield plate is useful to decrease the leakage magnetic flux.

The magnetic shield plate, however, short-circuits the magnetic flux exerting from the rotor permanent magnet and tends to reduce the generator output. Especially, in the case of a permanent magnet generator which thickness should be less than 2.0 mm, the output voltage is low even if no short-circuit occurs, so if short-circuit occurs, the output would lower further and the output required could not be obtained.

Since the diskette has the same outer shape as a 3.5" floppy, disk, it is usually handled together with a 3.5" floppy disks. The diskette incorporating a permanent magnet generator has the generator adjacent to one of end plates of the diskette case so that magnetic flux from the permanent magnet passes through the end plate leaks outside to affect other floppy disks which are handled together.

Accordingly, a back end that is one of the end plates is constituted by a magnetic shield which opening at the center of the plate has a size to allow only a hub to extrude. Covering a permanent magnet and a stator with the back end, magnetic flux leakage is avoided. In order to avoid the leakage of magnetic flux from the permanent magnet to the space for accommodating a memory card and its affection to the memory card information, a generator housing is thought to be made of magnetic shield.

However, when the back end made of magnetic shield has a construction covering the whole side surface of the rotor permanent magnet, a part of magnetic flux, that should be led from magnetic poles of the permanent magnet to stator magnetic poles, tends to leak to the back end adjacent to the outer edge of the ring permanent magnet and to lower the generator output. Also, since the back end is fixed and the rotor permanent magnet rotates relatively to the back end, a certain distance is needed between them to avoid their contact. By these reasons, the thickness direction gap of 0.2 to 0.3 mm is required between the back end and the permanent magnet to avoid the interference. Making such a distance of 0.2 to 0.3 mm in the generator thickness that should be less than 2.0 mm would result in necessity to thin the magnet further. And that must be avoided.

SUMMARY OF THE INVENTION

Accordingly, it is an object of the present invention to provide a diskette which has a permanent magnet generator and a space for insertion of a memory card adjacent to the generator, wherein bad affection by leakage magnetic flux from the generator to the memory card is substantially eliminated and the short-circuit of magnetic flux from the permanent magnet can be reduced to enhance an output of the generator.

And, it is another object of this invention to provide a diskette having a simple but tough construction that a rotor of the permanent magnet generator is supported by a magnetic shield.

It is still another object of the invention to provide a diskette which can be used to transmit information from and/or to a memory card, such as an IC card having a magnetic stripe, with a normal floppy disk drive.

It is further object of the invention to provide a diskette incorporating a permanent magnet generator, in which leakage magnetic flux from the incorporated permanent magnet is substantially eliminated and the output of the generator is maintained as well as the generator can be thinned.

A diskette incorporating a permanent magnet generator according to this invention comprises a diskette case in which disposed are a memory card space, a permanent magnet generator positioned adjoining the memory card space and a partition put between the memory card space and the permanent magnet generator. In the memory card space, a memory card having a magnetic stripe can be inserted for input/output to and/or from the memory card. The permanent magnet generator comprises a permanent magnet rotor having a ring permanent magnet with a plurality of magnetic poles arranged on the circumferential surface of the magnet and rotatable together with a hub of the diskette and a stator facing the rotor magnetic poles via a magnetic gap.

The partition has a magnetic shield on the portion between the permanent magnet rotor and the position where the magnetic stripe of the memory card should locate and has no magnetic shield on the other portion of the side end of the rotor.

The partition may be made of a magnetic shield. In that case, the magnetic shield has an opening on the other portion of the side end of the rotor, that is, on the portion other than the portion between the permanent magnet rotor and the position where the magnetic stripe of the memory card should locate. Alternatively, the partition may be made of a non-magnetic material. In that case, a magnetic shield is positioned on the portion between the permanent magnet rotor and the position where the magnetic stripe of the memory card should locate.

The permanent magnet generator may be positioned in a housing put in the diskette case. In that case, one wall of the housing constitutes the partition. When the housing is made of a magnetic shield, the magnetic shield has an opening on the other portion of the side end of the rotor. Alternatively, when the housing is made of non-magnetic material, it has a magnetic shield on the portion between the permanent magnet rotor and the position where the magnetic stripe of the memory card should locate. The magnetic shield has an opening on the other portion of the side end of the rotor. The rotor is preferably axially supported on the magnetic shield positioned on the portion between the rotor and the position where the magnetic stripe of the memory card should locate.

A housing surrounding the stator has preferably a magnetic shield at least at a housing wall between the permanent magnet generator and the memory card space. And the magnetic shield has an opening at the side of the rotor and has a magnetic shield bridge crossing the opening at the side of the magnetic stripe of the memory card that should be inserted, in order to cover the magnetic stripe. The magnetic shield bridge preferably axially supports the permanent magnet rotor. The permanent magnet rotor may be positioned inside of and adjacent to one end plate of the diskette case. The ring permanent magnet has preferably coaxially a magnetic shield ring having an outside diameter equal to or more than the outside diameter of the ring permanent magnet on a side end of the permanent magnet which side end is adjacent to the end plate of the diskette case. It is practical that the end plate of the diskette case has an opening a little larger than the magnet shield ring approximately at the center of the end plate, and that the magnetic shield ring is positioned in the opening and substantially level with the end plate. The protrusion of the magnetic shield ring from the circumference of the ring permanent magnet is preferably 0.1 to 1.0 mm. And the thickness of the magnetic shield ring is desirably 0.1 to 0.5 mm. The material of the magnetic shield ring is preferably of permeability more than 50.

A diskette incorporating a permanent magnet generator according to this invention comprises a diskette case and a permanent magnet generator positioned in the diskette case. The permanent magnet generator comprises a permanent magnet rotor positioned inside of and adjacent to one end plate of the diskette case and having a ring permanent magnet with a plurality of magnetic poles arranged on the circumferential surface of the magnet and rotatable together with a hub of the diskette, and a stator facing the rotor magnetic poles via a magnetic gap. The ring permanent magnet has coaxially a magnetic shield ring having an outside diameter equal to or more than the outside diameter of the ring permanent magnet on a side end of the permanent magnet which side end is adjacent to the end plate of the diskette case. It is practical that the end plate of the diskette case has an opening a little larger than the magnet shield ring approximately at the center of the end plate, and that the magnetic shield ring is positioned in the opening and substantially level with the end plate. The protrusion of the magnetic shield ring from the circumference of the ring permanent magnet is preferably 0.1 to 1.0 mm. And the thickness of the magnetic shield ring is desirably 0.1 to 0.5 mm. The material of the magnetic shield ring is preferably of permeability more than 50.

By this construction, the end plate of the diskette case and the magnetic shield ring constitute a substantially same plane covering the rotor permanent magnet without interference between them in the thickness direction. So, avoiding a wasteful gap between them, the invention can provide a diskette in which external leakage magnetic flux is reduced and an improved generator output is maintained.

A magnetic stripe of an IC card etc. that is to be inserted into the diskette has a strong or weak coercive force, as the case may be, and when a card with a weak coercive force is put on a diskette, information stored in the card might be erased. To prevent such a case, magnetic shield must be enough. To treat with this, the invention is made based on the discovery of the fact that magnetic shielding depends on the covering amount of a magnetic shield plate on a magnetic gap of the generator and the thickness and the material of the shield plate. First, it is effective that the magnetic shield ring has an outside diameter equal to or more than an outside diameter of the ring-shaped permanent magnet to protrude from the circumference of the magnet and to cover the magnet. The protrusion is preferably 0.1 to 1.0 mm to cover the magnetic gap between the rotor poles and the stator poles, but it is practical that the protrusion is selected to be 0.3 to 0.6 mm which is about twice the magnetic gap length. Next, regarding the thickness of the magnetic shield ring, the thicker, the better and it is practically determined to be 0.1 to 0.5 mm. When the diskette thickness is required to be thinner, it is more preferable to be 0.1 to 0.3 mm. In addition, the material of the magnetic shield ring should be taken into account. The higher the permeability, the more desirable. The permeability is required to be at least 50.

The diskette having a permanent magnet generator is desirably able to be driven and input/output by a disk drive, such as a 3.5" floppy disk drive.

BRIEF DESCRIPTION OF THE DRAWINGS

FIG. 1 shows a diskette incorporating a permanent magnet generator of an embodiment according to the present invention; FIG 1A being a plane (bottom) view of the diskette, FIG. 1B a cross-sectional view taken along line 1B—1B in FIG. 1A, and FIG. 1C a partially enlarged view of FIG. 1B.

DETAILED DESCRIPTION OF THE PREFERRED EMBODIMENTS

Figure 2:
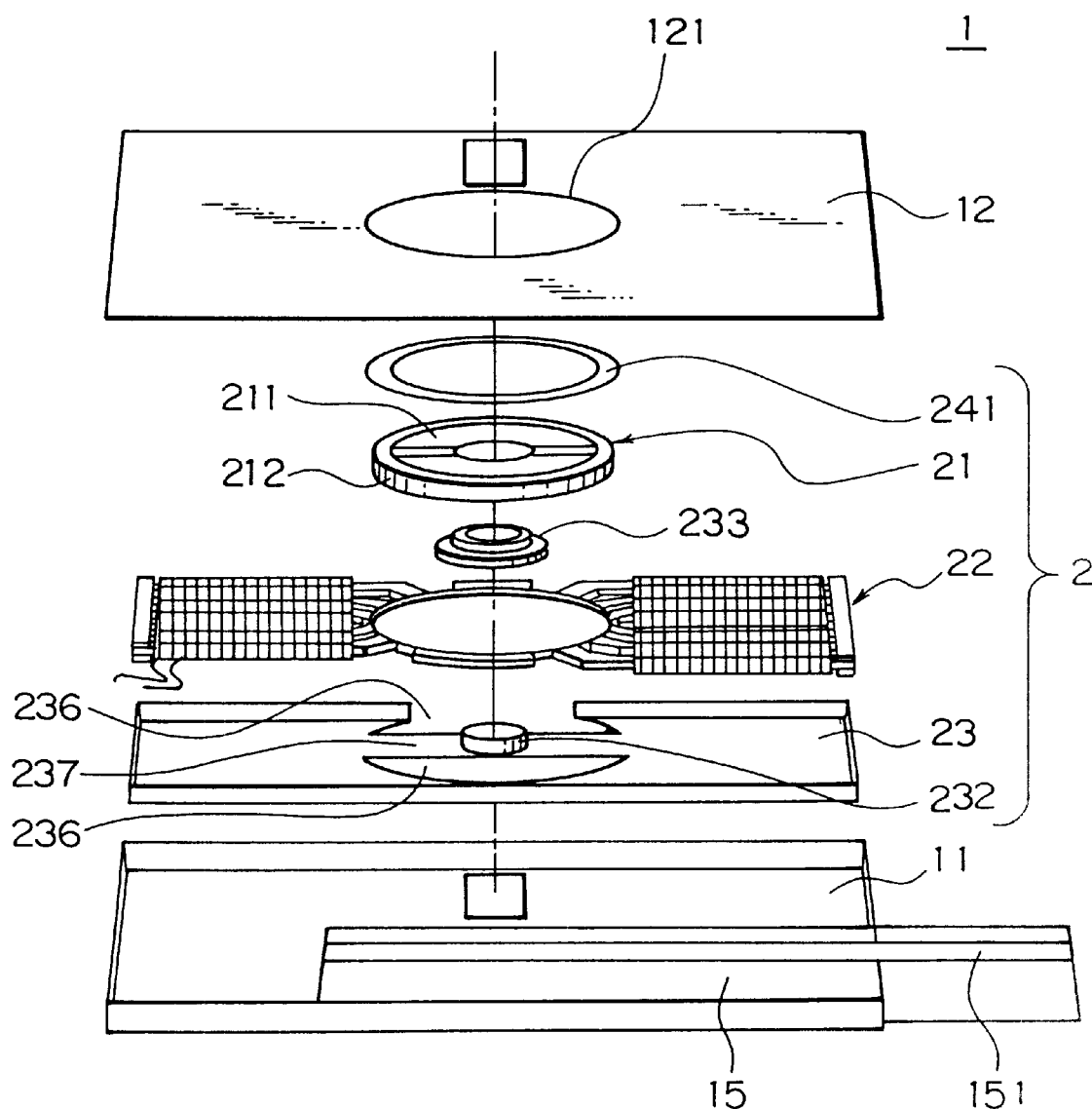
FIG. 2 is an exploded perspective view of the diskette of FIG. 1.

In the following, a diskette incorporating a permanent magnet generator according to the present invention will be described, referring to the accompanying drawings.

First, the construction of a diskette incorporating a permanent magnet generator according to the first embodiment of the present invention will be described. Although the following description is focused on a diskette that can be loaded on a 3.5" floppy disk drive, the present invention can be applied to a diskette of other sizes and constructions, as is evident from the following description. A 3.5" diskette (what is normally called 3.5" floppy disk) 1 has such a construction as shown in a plan (bottom) view of FIG. 1A, encased in a plastic case of 94 mm in length, 90 mm in width and 3.5 mm in thickness. The diskette case 1 includes a front end plate 11 and a back end plate 12. The back end plate 12 is made of a thin plate with an opening 121 at the center through which a hub 211 is protruded outside the case. On one end of the case provided is a head slot 13 through which an input/output magnetic head can contact a disk. The hub 211 is rotated by transmitting the rotation of the drive shaft of the floppy disk drive. A floppy disk would be fitted coaxially with the hub so that it could rotate together with the hub.

In the diskette 1 incorporating the permanent magnet generator according to the embodiment of the present invention, a permanent magnet generator 2 is fitted around the hub 211 in the middle of the diskette 1. A rotor 21 of the generator 2 comprises the hub 211 and a ring-shaped permanent magnet 212 having a plurality of magnetic poles on the circumference. The ring-shaped permanent magnet 212 is fitted on the outer circumference of the hub 211 and can be rotated together with the hub 211. A stator 22 of the generator 2 is provided inside the diskette 1 on the outer circumference of the rotor permanent magnet 212 with a magnetic gap between the stator and the outer circumferential surface of the permanent magnet 212. The diskette shown in the figure, which is used as an input/output device for a card having magnetic stripes (hereinafter referred to as "memory card"), such as an IC card and magnetic card, has a space 15 for inserting a memory card and a card contact terminal 16 for exchange of information with the memory card. An input/output terminal 17 for exchange of information between the diskette and the magnetic head of the floppy disk drive is provided at the head slot 13 through which the magnetic head could contact the disk. A CPU 18 for processing information between the input/output terminal 17 and the card contact terminal 16 is provided as necessary. The permanent magnet generator 2, which is used as a drive power for driving the CPU 18 and the card contact terminal 16, requires rectification and stabilization because electric power generated by the generator may sometimes contain ripples, etc. A stabilized power supply circuit 19 is therefore incorporated in an output line of the generator 2 provided in the diskette.

The rotor 21 of the permanent magnet generator 2 is caused to rotate as the drive shaft thereof is rotated by the hub 211 that is engaged with the drive shaft of the floppy disk drive. In the case of a 3.5" floppy disk drive, the revolution of the drive shaft is normally 300 rpm. As the hub 211 is engaged with the drive shaft of the floppy disk drive in this way, the construction of the portion at which the hub 211 is engaged with the drive shaft should preferably be the same as that of the hub of a normal diskette.

FIG. 1A shows in broken lines the relative locations of the permanent magnet generator 2, the input/output terminal 17 and the card contact terminal 16. If the outer circumference of the stator yoke of the permanent magnet generator 2 assumes a perfect circle, the outer circumference of the stator yoke 221 may interfere with the input/output terminal 17 or the card contact terminal 16. To cope with this, therefore, the outer circumference of the stator yoke 221 should preferably be notched to clear these terminals.

In order to describe the constructions of a housing 23 and the diskette 1, FIG. 2 shows an exploded perspective view of the diskette 1. In the figure, a front end 11 and a back end 12 of the diskette case are respectively shown at the bottom and at the top. In this embodiment, the front end 11 is made of plastics but preferably of a metallic plate to improve its toughness and may be made of magnetic or non-magnetic stainless steel material. The back end 12 is made of non-magnetic stainless steel (SUS 304) of 0.1 mm thick. The back end 12 is preferably made of non-magnetic material, such as non-magnetic stainless steel and plastics, but it may be stainless steel having a little magnetization caused by heat-treatment. The permanent magnet generator 2 is installed in the housing 23 and a bearing 233 at the center of a hub 211 of the generator rotor 21 is axially supported by a shaft 232 fixed to the housing 23. The housing 23 accommodating the generator 2 overlaps the memory card space 15 and adjoins it. A magnetic stripe 151 of a memory card to insert in the memory card space 15 locates around the position of the bearing 233, as shown in FIG. 1A. The housing 23 is made of cold-rolled steel sheet of 0.1 mm thick (saturation magnetic flux density:around 1.5 T) and has at the position corresponding to the side end of the generator rotor 21 two half-round openings 236 opposite to each other and a magnetic shield bridge 237 between the two openings at the position corresponding to the magnetic stripe 151. The shaft 232 is fixed on the magnetic shield bridge 237.

Figure 3:
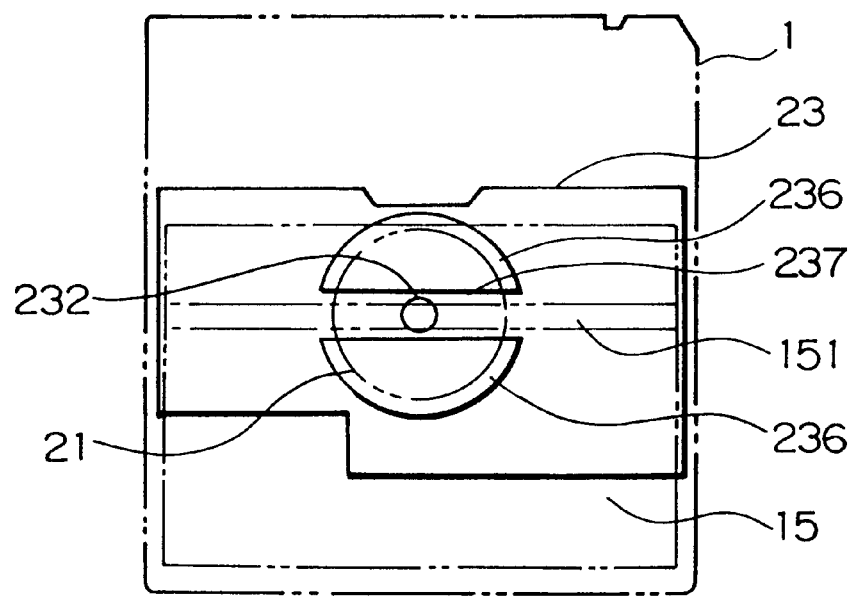
FIG. 3 is a bottom view of a generator housing used in the diskette shown in FIG. 1, FIGS. 4 and 5 show a bottom view of generator housing used in another diskette.

To show their positional relationship, FIG. 3 shows a bottom view of the housing 23, viewing from the front end 11 of the diskette 1. Here shown are their circumferences of the diskette 1, the card space 15, the magnetic stripe 151 and the rotor 21 by double dotted lines. In order for the magnetic shield bridge 237 to completely cover the magnetic stripe 151 and for leakage magnetic flux from the rotor permanent magnet 212 not to affect the magnetic stripe, the magnetic shield bridge 237 is preferably a little wider than the magnetic stripe 151. For example, the width of the bridge 237 is 6 to 10 mm. If the memory card were reversibly inserted, the magnetic stripe of it would not locate at the position the magnetic stripe should be and the stripe might be affected. Assuming such a case, the bridge can be located to cover the magnetic stripe even when the card is inserted normally or reversibly. The half-round openings 236 disposed on the housing have a diameter more than the rotor permanent magnet 212 and preferably more than the inside diameter of the stator pole inner circumference. It is desirable that the openings have such a diameter that the side faces of the stator magnetic poles can be seen through the half-round openings when looking to the generator 2 from the bottom of the housing 23. For example, the opening diameter is preferably 1 to around 5 mm larger than the inside diameter of the stator and is around 32 mm when the inside diameter is 29.4 mm.

Disposing the half-round openings 236 on the housing 23 means that there is no shield plate on the side end of the rotor permanent magnet 212 and around the circumferential edge of it except for the shield bridge 237. Since magnetic poles are positioned on the circumferential surface of the permanent magnet 212 and the magnetic flux from the magnetic poles tends to concentrate on the circumferential edge line on the side ends of the permanent magnet, short-circuit of the magnetic flux between the permanent magnet poles is reduced by eliminating a shield plate a little outside the circumferential edge line, resulting in increasing the magnetic flux that is led to the stator poles. A magnetic shield bridge 237 corresponding only to the magnetic stripe 151 is positioned on the side of the rotor 21 to eliminate the affection to the magnetic stripe 151.

An opening 121 at the middle of the back end 12 has a diameter a little larger than the outside diameter of the rotor 21. A magnetic shield ring 241 of a soft magnetic plate of around 0.1 mm thick is fixed or pasted on the side end of the rotor permanent magnet 212 adjacent to the back end 12. The outside diameter of the magnetic shield ring 241, in this embodiment, is substantially equal to that of the permanent magnet 212 and the inside diameter of the ring is approximately equal to or a little smaller than that of the magnet 212. Therefore, the magnetic shield ring 241 completely covers a side surface of the permanent magnet 212. If the outside diameter of the magnetic shield ring 241 is smaller than the magnet, the outer circumferential edge of the permanent magnet would protrude from the outer circumference of the shield ring to cause magnetic flux to leak outside. At present, there are some kinds of memory cards having different coercive forces (that is, a withstanding force for maintaining information against external magnetic field, e.g., 2750 Oe, 650 Oe and 300 Oe). A high coercive force card has been generally used since an external disturbance to recorded information in the card can be avoided The card having a high coercive force will not be affected even when the card is put on a diskette leaking magnetic flux, but a low coercive force card can not afford leakage magnetic flux. So, the outside diameter of the magnetic shield ring should be at least substantially equal to the outside diameter of the permanent magnet to prevent magnetic flux from leaking outside, and preferably at least 0.1 mm larger. It is desirable that the protrusion of the shield ring from the outer circumference of the magnet is larger, but since the larger protrusion of the ring tends to cause the decrease of the generator output, the outer protrusion should be restricted within a certain amount, as described later in detail. The inside diameter size is not a matter to the function of the diskette, but from an appearance the inner circumference of the shield ring should fit on the outer circumference of the hub.

As shown in FIG. 1C, when the permanent magnet generator 2 is incorporated in the diskette 1, the magnetic shield ring 241 is substantially level with the back end 12 and has a small gap between its outer circumference and the inner circumference of the opening 121 of the fixed back end 12. The small gap is about 0.1 to about 1.0 mm wide. If the gap is larger than this, it is feared that dust may enter inside through the gap, and the gap is desirably 0.2 to about 0.5 mm. As described above, the gap between the outer circumference of the shield ring 241 and the inner circumference of the opening of the back end 12 is maintained to be 0.1 to about 1.0 mm so that the short-circuit of the permanent magnet flux is reduced while the same shielding is effected as a shield plate covering the whole side of the generator. Since the shield ring 241 is positioned outside the diskette, the gap can be easily measured from outside of the completed diskette.

In a conventional diskette having a magnetic shield as the whole back end, it was necessary that a rotor must have a gap of at least 0.2 to 0.3 mm in the thickness direction between the back end made of shield plate and a side end of the rotor permanent magnet 212 to rotate the rotor against the fixed shield plate and to avoid the short-circuit of the magnetic flux. Such a gap results in increasing the generator thickness by the gap size. The construction of this embodiment, however, eliminates the necessity of arranging the extra space in the generator and can thin the generator. The diskette referred to according to this invention is not limited to a 3.5" floppy disk but can be modified in its shape, size and structures arbitrarily. In addition, the card is not limited to an IC card and a magnetic card, but should be applied to a memory card in a wide meaning including flash memories.

Figure 4:
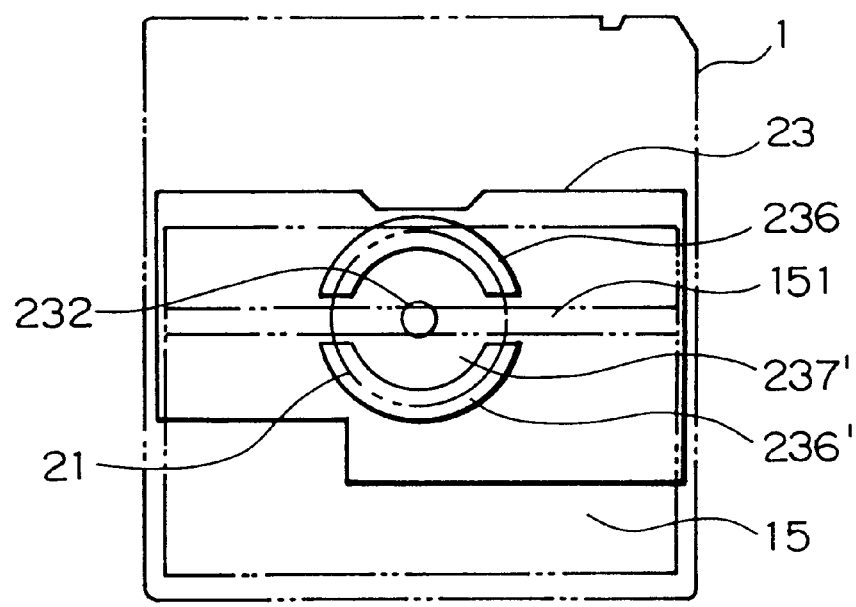
Figure 5:
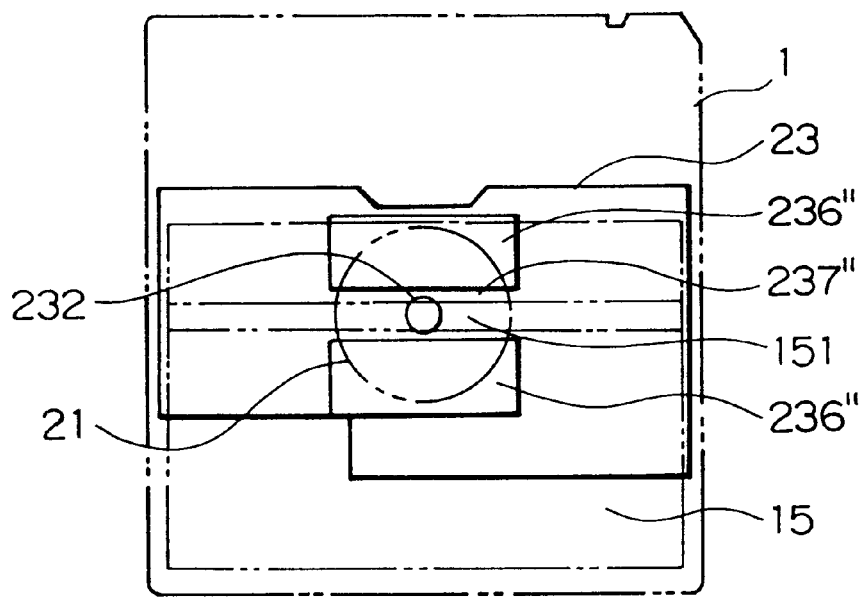

FIGS. 4 and 5 show respectively a bottom view of another embodiment having a little changed construction of a housing 23, viewed from a front end 11 of the diskette 1, as shown in FIG. 3. In FIG. 4, arc segment openings 236' are disposed respectively at the upper and lower portions of the side of the generator rotor 21 in place of the half-round openings 236 of FIG. 3 and a magnetic shield bridge 237' has a round plate coaxially with a rotor bearing. The inside diameter of the arc segment openings 236', also, is larger than the rotor diameter and preferably the inside diameter of the stator poles. The shield bridge 237' is a little wider than the width of the magnetic stripe 151. In FIG. 5, square openings 236" are disposed respectively at the upper and lower portions of the side of the generator rotor 21, having a shield bridge 237" similar to the bridge 237 shown in FIG. 3. It should be understood that these work the same as those in FIG. 3.

Figure 6:
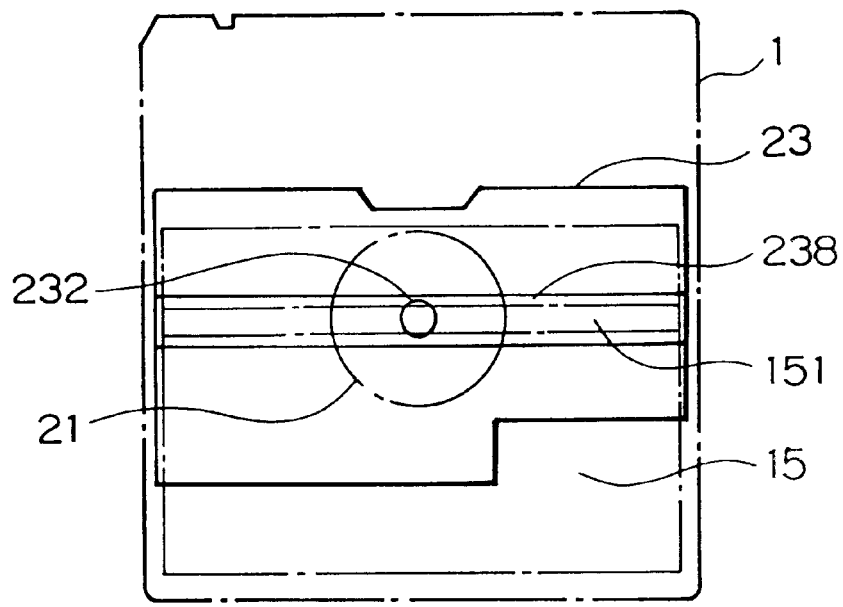
FIG. 6 is a plane view of a generator housing used in still another diskette.

FIG. 6 shows a construction that a housing 23 is made of non-magnetic material, such as plastic plates, and has a magnetic shield 238 made of magnetic shield material (soft magnetic material) a little wider than the magnetic stripe 151 and pasted on an inner wall of the housing 23 at the position equivalent to the above mentioned magnetic shield bridge 237, 237' and 237". This figure is a plane view of the housing 23 looked from the back end 12 of the diskette 1. On the magnetic shield 238 supported is a shaft 232 of the rotor. The magnetic shield 238 is located at the position corresponding to the magnetic stripe 151 to shield between the magnetic stripe 151 and the rotor 21.

Figure 7:
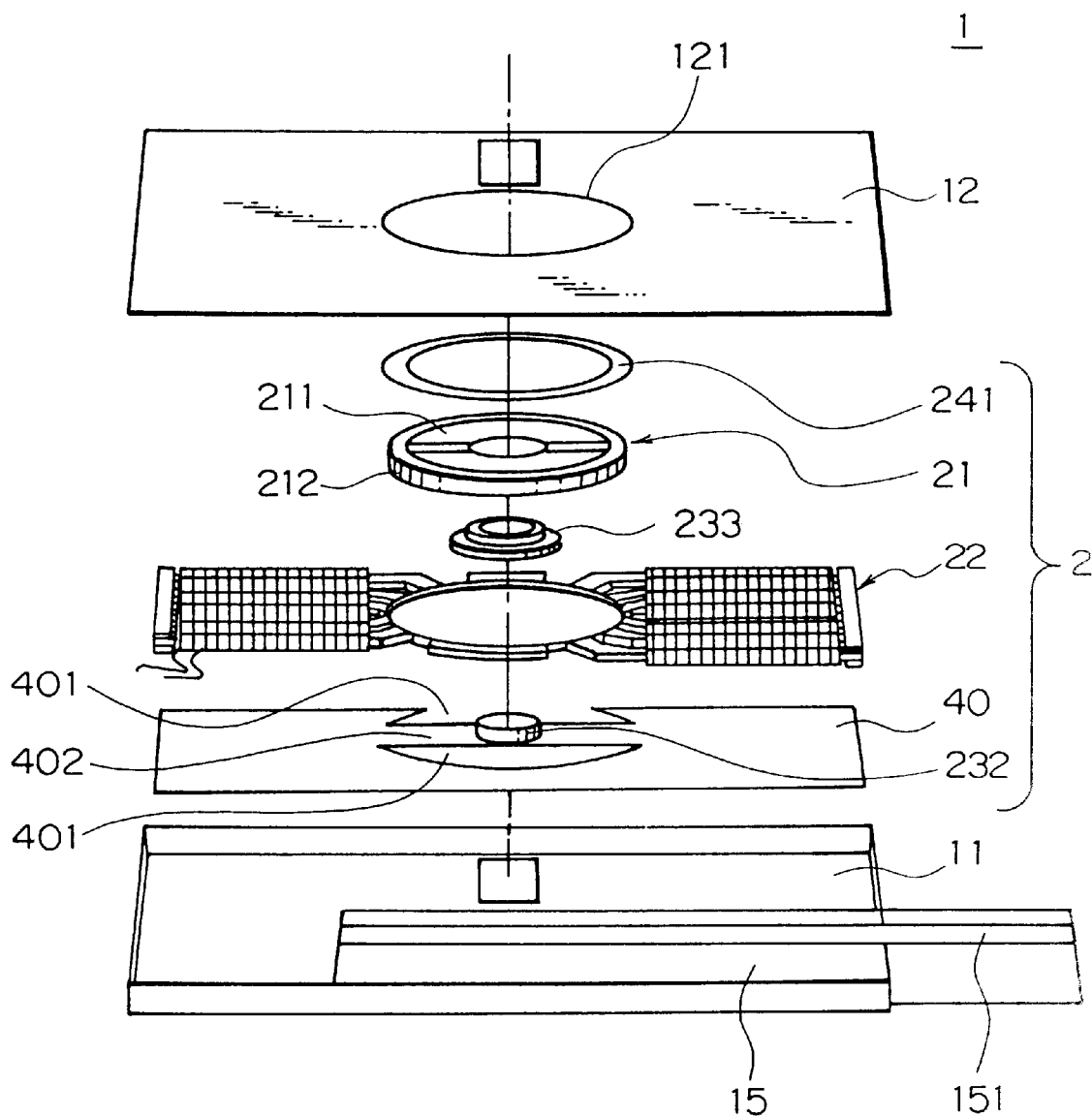
FIGS. 7 and 8 are an exploded perspective view of a diskette incorporating a permanent magnet generator of another embodiment according to this invention.
Figure 8:
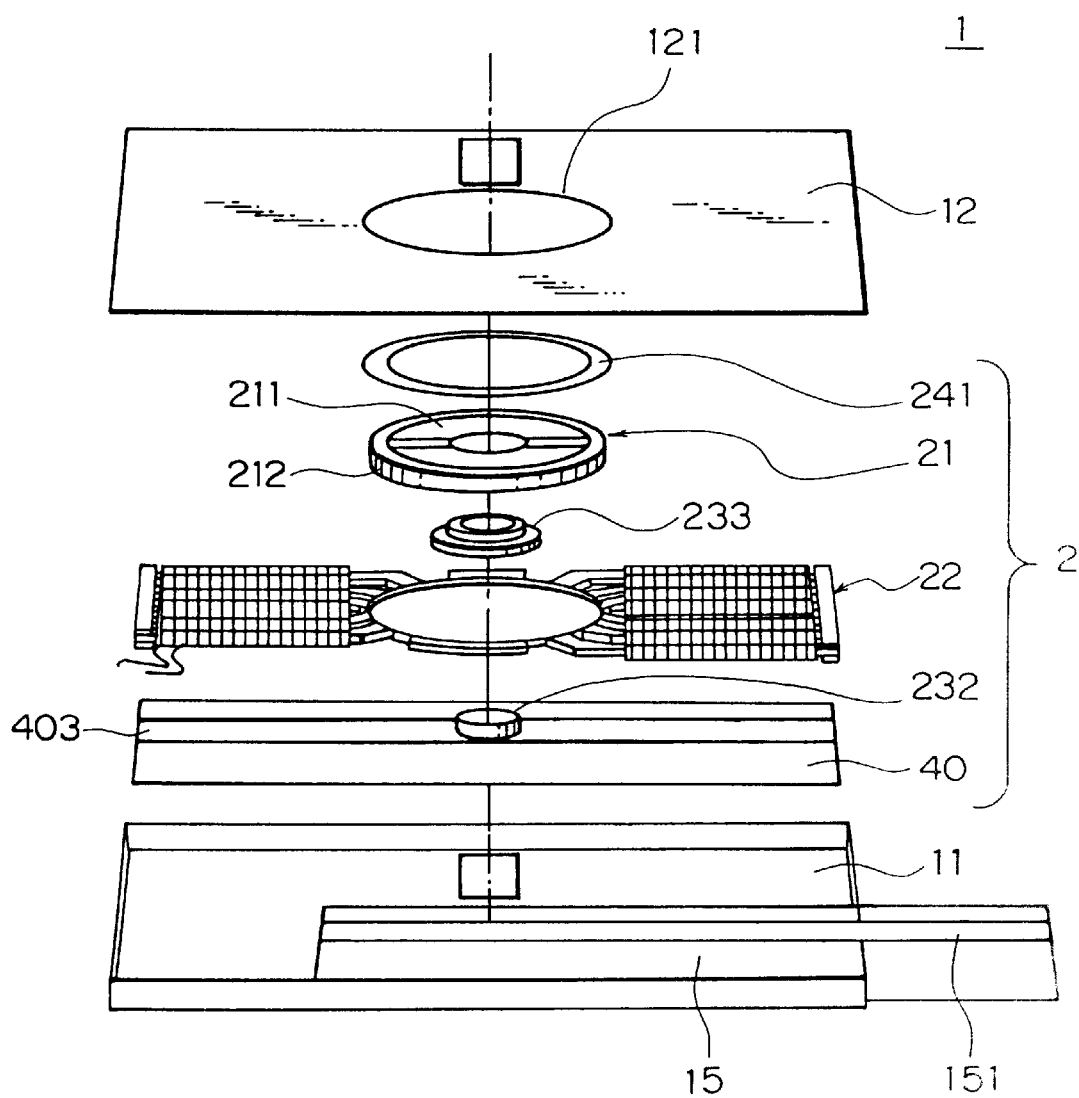

FIGS. 7 and 8 show exploded perspective views of embodiments, according to this invention, that partitions 40 are disposed between the generator 2 and the card space 15 in the diskette 1, instead of the housing 23. In these figures, all elements and constructions except for the partitions 40 are the same as in FIG. 2 and only the partitions 40 will be explained here. The partition 40 of the diskette 1 shown in FIG. 7 is made of a magnetic shield plate and half-round openings 401 are disposed at the upper and lower portions on the partition 40, as shown in FIGS. 2 and 3, having a magnetic shield bridge 402 between the openings. Since the half-round openings 401 and the shield bridge 402 are the same as shown in FIGS. 2 and 3, they work the same. In FIG. 8, the partition 40 is made of non-magnetic material, such as a plastic plate, and has a magnetic shield plate 403 of soft magnetic material a little wider than the magnetic stripe 151 pasted on the partition at the position equivalent to the afore-mentioned magnetic shield bridge 402. It is apparent that the magnetic shield works the same as the above.

Now referring to FIGS. 2, 3, 9 and 10, the construction of the generator will be described in detail. Numeral 21 denotes rotor where the ring-shaped permanent magnet 212 is fixedly fitted around the outer circumference of the hub 211. The permanent magnet 212 has a plurality of rotor magnetic poles at substantially equal angular intervals on the outer circumference thereof; the magnetic poles being arranged in alternately different polarities (i.e., NSNS - - - ) in the circumferential direction.

A stator 22 having a plurality of stator magnetic poles disposed in such a manner as to face the outer circumference of a permanent magnet 212 via magnetic gaps of substantially the same size is provided. The stator magnetic poles of the magnetic pole teeth 223 made of soft magnetic material are provided on one end of the teeth in such a manner as to face the outer circumference of the permanent magnet 212 at a time. The magnetic poles of the magnetic pole teeth 223 are disposed on the inner circumferential surface of the stator 22 at substantially equal angular intervals in such a manner as to face the rotor magnetic poles via magnetic gaps of substantially the same size at a time. For this reason, the number of the stator magnetic poles should ideally be the same as that of the rotor magnetic poles, but in the embodiments shown, the number of stator magnetic poles 227 has been reduced by the notches 226 and 226' provided on the stator 22, as will be described later. A stator coil 225 is wound on each of the magnetic pole teeth 223. The stator coils 225 are connected in series to each other. The adjoining magnetic pole teeth 223 having magnetic poles at one end in each block are arranged substantially in parallel with each other. The stator magnetic poles are disposed at substantially equal angular intervals, that is, radially with respect to the rotor, so that the stator magnetic poles can face the rotor magnetic poles, whereas at least those portions on which the stator coils 225 are wound of the magnetic pole teeth 223 in each block are bent near the magnetic poles at the tips of the magnetic pole teeth so that the magnetic pole teeth in the block are arranged in parallel with each other. The magnetic pole teeth 223 are divided into two blocks; i.e., the left-hand block and the right-hand block in FIG. 9. The magnetic pole teeth 223 in each block are connected, at ends opposite to the stator magnetic poles, to each other by a back yoke 224. In the present invention, the entire magnetic pole teeth can be combined in one block, or divided into two to four blocks. Where various types of equipment are incorporated in a limited space, as in the diskette case, the number of blocks should be limited to one to two blocks to minimize the space for the generator.

The magnetic pole teeth 223 in each block should preferably be such that the adjoining stator magnetic poles are connected to each other by an inner yoke 222. The construction in which the stator magnetic poles face the rotor magnetic poles at a time tends to increase cogging torque. Connecting the stator magnetic poles by an inner yoke 222 causes magnetic flux to leak between the magnetic poles, leading to reduced cogging torque. Increasing leakage flux between the magnetic poles in an attempt to reduce cogging torque, however, could reduce the effective flux passing in the magnetic pole teeth. To cope with this, the cross-sectional area of the inner yoke 222 between the stator magnetic poles is made smaller than the cross-sectional area of the stator magnetic pole teeth 223. When the width of the magnetic pole teeth is 3 mm, the thickness of the inner yoke is set to 0.5 mm to allow almost all magnetic flux coming out of the rotor magnetic poles to pass through the stator magnetic pole teeth.

The length (the vertical length on the page in FIG. 9) of the generator 2 becomes the sum of the diameter of the rotor 21 and the size of the stator magnetic poles, that is, a considerably small space occupied by the generator to be incorporated into the diskette, by dividing the magnetic pole teeth 223 into two blocks. This is accomplished by bringing the adjoining stator coils 225 close to each other and arranging them in parallel with each other, leaving virtually no dead space between the coils.

As noted earlier, a card contact terminal 16 for connecting to a memory card and an input/output terminal for connecting to a floppy disk drive are provided on the diskette case 1 to exchange information. The present invention makes it possible to avoid interference between the generator 4 and the card contact terminal 16 and the input/output terminal 17.

Figure 9:
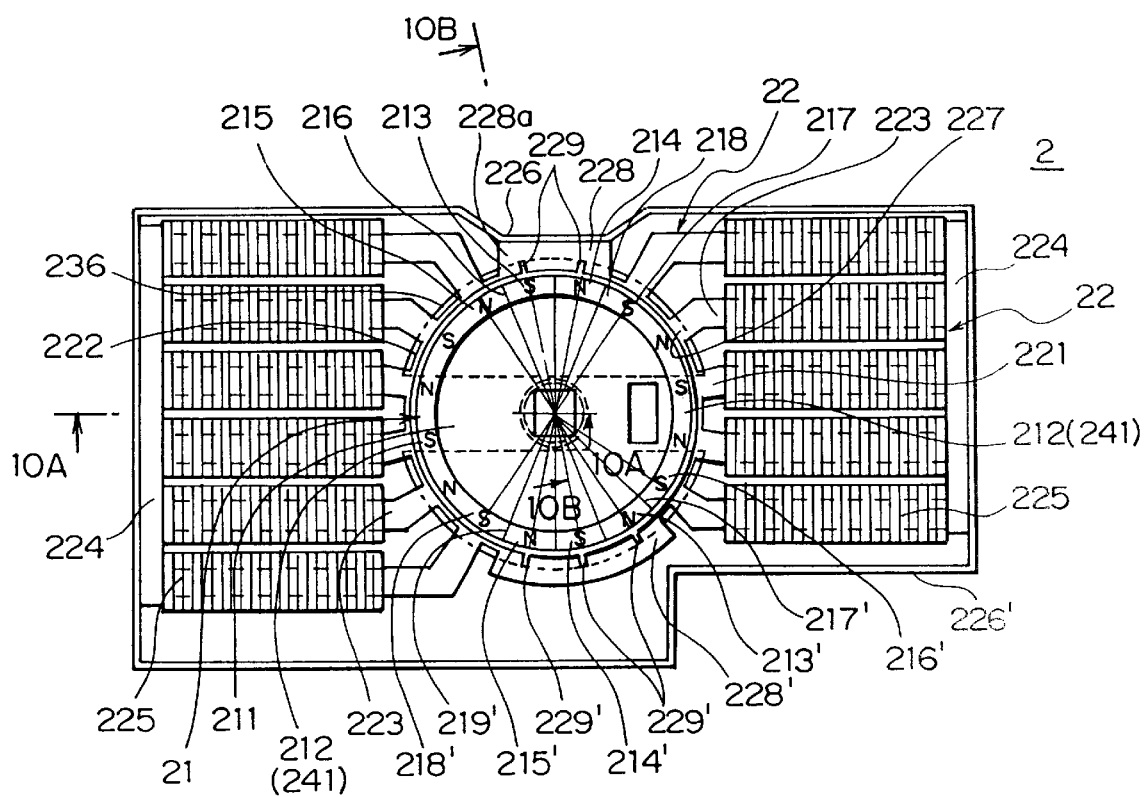
FIG. 9 is a plane view of a permanent magnet generator used in the diskette shown in FIG. 1, FIGS. 10A and 10B are a cross-sectional view taken along line 10A—10A and 10B—10B respectively of FIG. 9, FIGS. 11A, 11B and 11C are respectively a perspective view of a diskette incorporating a permanent magnet generator of still another embodiment according to the invention, a cross-sectional view of the whole diskette of FIG. 11A and a partially enlarged cross-sectional view of a rotor in the diskette.
Figure 10A:
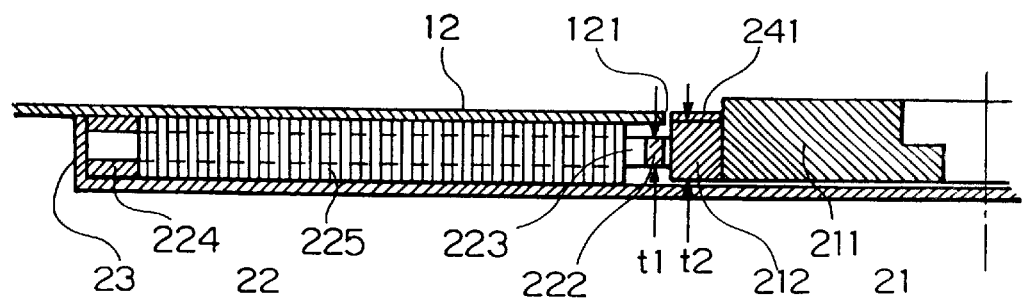
Figure 10B:
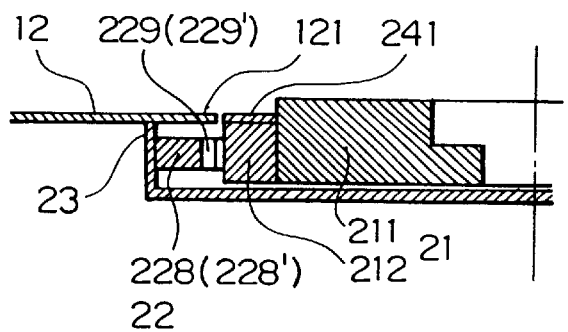

Dividing the magnetic pole teeth 223 into right and left blocks eliminates upper and lower magnetic pole teeth of the rotor 21. There are no stator magnetic poles at the locations of the removed magnetic pole teeth, that is, at notches 226 and 226' provided on the generator 1. This means that when the stator magnetic poles are disposed facing the rotor magnetic poles at a time, some of the rotor magnetic poles falling on the notches 226 and 226' have no stator magnetic poles to face. The number of rotor magnetic poles facing no counterparts on the stator is at least one pole, or preferably two to five poles and at most six. On the stator inner circumferential surface facing the rotor magnetic poles having no matching stator magnetic poles provided are soft magnetic pieces 228 and 228' made of soft magnetic material. The soft magnetic piece 228 covers from one side of the rotor magnetic pole to the other side. The soft magnetic pieces 228 and 228' shown in FIG. 9 magnetically connect two successive rotor magnetic poles 213 and 214, and three rotor magnetic poles 213' to 215'. The radial lengths of the soft magnetic pieces are shorter than the ordinary magnetic pole teeth 223, as shown in FIG. 10. In FIG. 9, the rotor magnetic poles S 213 and N 214 on the upper part do not face any stator magnetic poles. The left end 228a of the soft magnetic piece 228 is located at the mid-portion 216 between the S pole 213 and the N pole 215 at the left of the pole 213, from which the soft magnetic piece 228 extends rightward to the mid-portion 218 between the N magnetic pole 214 on the upper part, which does not face any stator magnetic pole, and the S pole 217 at the right of the pole 214. That is, the soft magnetic piece 228 faces the two successive rotor magnetic poles. Grooves 229 are provided in the axial direction on the surface of the soft magnetic piece 228 facing the S and N poles of the rotor.

The rotor magnetic poles N 213', S 214' and N 215' at the lower part of the figure do not face any stator magnetic poles, and a soft magnetic piece 228' is provided instead of the stator magnetic poles. This soft magnetic piece 228' extends from the mid-portion 217' between the N pole 213' and the S pole 216' at the upper right of the pole 213' to the mid-portion 219' between the N pole 215', which does not face any stator magnetic pole, and S pole 218' at the upper left of the pole 215'. That is, the soft magnetic piece 228' faces the three successive rotor magnetic poles. Grooves 229' are provided in the axial direction on the surface of the soft magnetic piece 228' facing the N pole 213', the S pole 214' and the N pole 215' of the rotor.

The soft magnetic pieces 228 and 228' magnetically connecting rotor magnetic poles are positioned on the stator inner circumferential surface facing those rotor magnetic poles having no matching stator magnetic poles when the rotor magnetic poles fall on the locations at which they should face the stator magnetic poles. Moreover, grooves (extending in the axial direction) 229 and 229' are provided on the soft magnetic pieces 228 and 228' at the locations facing the rotor magnetic poles. Thus, when the rotor magnetic poles are at locations shifting from the stator magnetic poles that should face the rotor magnetic poles, the soft magnetic pieces magnetically short-circuit the rotor magnetic poles. At this time the soft magnetic pieces attract the rotor magnetic poles facing the ends of the soft magnetic pieces. When the rotor magnetic poles fall on the locations at which they should face the stator magnetic poles, on the other hand, the axially extending grooves provided on the soft magnetic pieces face the rotor magnetic poles, making the standstill of the rotor magnetic poles at those locations unstable, causing the rotor to move in the direction of the ends of the soft magnetic pieces.

The rotor magnetic poles facing the stator magnetic poles act to cause the rotor to stop at the position at which they face the stator magnetic poles, while the rotor magnetic poles facing the grooves on the soft magnetic pieces act to cause the rotor to move from that position. Thus, the cogging torque of the rotor is reduced.

In the foregoing description, it is stated that the soft magnetic pieces 228 and 228' "connect the mid-portion between the magnetic poles on both sides of the rotor magnetic pole." The expression "the mid-portion between the magnetic poles" does not necessarily mean the central point between magnetic poles of different polarities when multiple magnetic poles are arranged on the outer circumferential surface of a cylindrical permanent magnet, but refers to peripheral parts excluding the center of the magnetic pole. When one rotor magnetic pole faces a stator magnetic pole, while the other rotor magnetic pole faces a groove provided on a soft magnetic piece, attraction force at the position of the other rotor magnetic pole is reduced, and as a result, the rotor magnetic pole is attracted to the soft magnetic piece on the side of the groove to produce a turning moment. Thus, the end of the soft magnetic pole may be shifted from the rotor magnetic pole to such an extent that the turning moment is generated.

As the output of the generator is generated by the stator coils wound on the stator magnetic pole teeth provided in such a manner as to face the rotor magnetic poles, if the number of rotor magnetic poles is 16 poles and one of them does not face a stator magnetic pole, the magnetic force of the rotor permanent magnet is reduced by $\frac{1}{16}$. This loss of magnetic force can be compensated by increasing the number of coil turns. As described above, soft magnetic pieces are provided in place of the stator magnetic poles at locations which they should face rotor magnetic poles. The number of removed stator magnetic poles should preferably be at least one pole, or more preferably be not less than two poles in a row. The total number of the removed stator magnetic poles is preferably less than 7, more preferably less than 6. The width of the grooves provided on the soft magnetic pieces should preferably be 0.1 to 0.4 of the width of the magnetic poles of the rotor permanent magnet. The width of the magnetic poles of the rotor permanent magnet is obtained as $2\pi (360°)/n$ (n: no. of rotor poles). The depth of the grooves may be more than the magnetic gap between the rotor and the stator.

The magnetic pole teeth 223, the inner yoke 222 and the back yoke 224 of the stator 22 are all made of soft magnetic material. Since high saturation magnetic flux density Bs is desirable in reducing the cross-sectional area of parts to reduce the entire generator, soft magnetic material having a saturation magnetic flux density Bs of more than 1.2 such as soft iron, electromagnetic soft iron, dust iron core and silicon steel containing 4 to 6% Si can be used. A stator coil 225 for generating output is wound on each magnetic pole tooth 223. The generator 2 is of a flat disk shape as a whole, the thickness of which must be not more than 2 mm at the thickest. It is therefore necessary to reduce the outermost diameter of the stator coil 225 wound on the magnetic pole tooth 223, that is, the thickness in the axial direction, to not more than 2 mm.

A ring-shaped permanent magnet is desirable as a permanent magnet 212 used in the rotor 21, as noted earlier. This permanent magnet 212 is fixedly fitted to the outer circumference of the hub 211 by adhesive, for example. This ring-shaped permanent magnet has an appropriate length in the axial length, that is, an appropriate thickness. The thickness of the permanent magnet is 2.0 mm at the maximum, the practically usable range is 0.8 to 2.0 mm, and the preferable thickness range is 1.0 to 1.8 mm. Apparently this size can vary depending on the size of diskette used, or the configuration of equipment to be incorporated together with the magnet.

The thickness in the magnetizing direction of the ring-shaped permanent magnet 212 is desired to be as thick as possible in terms of magnetomotive force. With a permanent magnet having radially easy magnetization axis or a radial anisotropy, the use of a hub 211 made of ferromagnetic material can cause the magnetic lines entering in the radial direction of the magnet from the adjoining magnetic poles on the circumferential surface to connect in the hub made of ferromagnetic material to the magnetic lines entering in the radial direction from the magnetic poles of the opposite polarity. With a permanent magnet having a polar anisotropy, the magnetic poles of the opposite polarity are connected to each other within the magnet by magnetic lines. In both cases, the radial thickness of the permanent magnet 212 may be thicker than $\frac{1}{3} \sim \frac{1}{4}$ of the distance between the magnetic poles, and should more preferably be more than 2 mm.

The material of the permanent magnet 212 should preferably be a sintered NdFeB magnet. Since the permanent magnet used in the present invention has a large demagnetizing factor due to its shape and a large inverse magnetic field is applied to the magnet, despite its relatively thin thickness (that is, relatively thin thickness in the magnetizing direction), a magnet having a large coercive force and a large magnetic flux density like a NdFeB magnet is therefore desirable. Since sintered NdFeB magnets normally have a magnetic anisotropy, the magnet used in the present invention should preferably be a magnet having the axis of easy magnetization in the radial direction, or a radial anisotropy, and a magnet having the axis of easy magnetization in the direction in which the adjoining magnetic poles of different polarities on the circumferential surface are connected, or a polar anisotropy. A bonded NdFeB magnet made by binding NdFeB magnet powder with plastic binder can also be used, but a bonded magnet generates less magnetic flux because it has a smaller magnet content compared with a sintered NdFeB magnet. Where only a small output is required, a permanent magnet generator made with a bonded magnet may suffice for the purpose.

Instead of NdFeB magnets, (1) nitride magnets, such as SmFeN magnets, (2) magnets containing SmFeN and $\alpha$ iron, often referred to as exchange spring magnets, and magnets containing NdFeB and $\alpha$ iron, magnets containing NdFeB and Fe3B, etc., (3) NdFeB, SmFeN and other HDDR (hydrogenation, decomposition, dehydration and recombination) magnets, and (4) SmCo magnets can be used, depending on required properties.

Although the figures show a ring-shaped permanent magnet 212 having 16 magnetic poles on the outer circumferential surface, the number of magnetic poles in the present invention should preferably be 12 to 24 poles, and more preferably 16 to 20 poles. With decreases in the number of magnetic poles, the amount of flux per pole increases, but a generator having a permanent magnet having 16 to 24 poles generates the highest output. With increases in the number of magnetic poles, on the other hand, the space between the stator magnetic pole teeth extending outward becomes smaller, and the number of coil turns on the magnetic pole teeth is also reduced. Moreover, the manufacture of the stator becomes more difficult, and distortions are caused in the output voltage waveform. Thus, the most desirable number of magnetic poles is 16 to 20.

The thickness of the magnetic poles of the outwardly extending stator magnetic pole teeth 223 must be smaller than the axial length, that is, the thickness of the permanent magnet 212. That is, if the stator magnetic pole teeth are thicker than or equal to the axial length of the rotor, the stator becomes thicker by the thickness of the stator windings than the rotor. As in a generator of this invention strictly restricted in the axial length, it is important that the total thickness of the stator magnetic poles and the windings on them is limited within the axial thickness of the rotor, to improve the space utilization in the limited axial length. To accomplish the high space utilization, it is useful to make the teeth of the stator thinner than the rotor and to make the total thickness of the stator including the windings almost equal to the axial length of the rotor. By making the thickness of the stator magnetic pole teeth 223 smaller than the thickness of the permanent magnet, a larger output can be generated by the generator 2. The thickness of magnetic poles of the stator magnetic pole teeth 223, however, must have a thickness enough not to be saturated by magnetic flux generated by the permanent magnet 212. FIG. 10A shows cross-sectional relationship of the stator 22 and the rotor 21 of the permanent magnet generator 2 according to the present invention, showing the thickness t1 of the outwardly extending stator magnetic pole teeth and the thickness t2 of the magnet. In the figure, t1 must be smaller than t2 (t1<t2). This is to introduce as much magnetic flux as possible into the outwardly extending magnetic pole teeth 223 constituting the stator 22 by concentrating magnetic flux exerting from the magnetic poles of the permanent magnet 212, and increase the magnetic flux density in the magnetic pole teeth. When comparing the magnetic flux density of the permanent magnet 212 with the saturation magnetic flux density of the stator magnetic pole teeth 223, the saturation magnetic flux density of a stator magnetic pole teeth 223 made of soft magnetic material is more than 1.2 T (Tesla), while even a permanent magnet 212 made of a sintered NdFeB magnet having the strongest magnetic force has a magnetic flux density of about 1.0T at the working point because its residual magnetic flux density is 1.2 to 1.3T. When a sintered NdFeB magnet is used as the rotor permanent magnet 212 and a stator 22 having a saturation magnetic flux density of more than 1.2 T is used, the thickness of the magnetic pole teeth 223 should preferably be 30 to 70% of the thickness of the permanent magnet.

The diskette incorporating a permanent magnet generator according to the invention will be described in detail, referring to the experiments shown below, together with requirements for implementing this invention.

Experiment 1

Diskettes incorporating permanent magnet generators as shown in FIGS. 1 through 3, 9 and 10 were manufactured based on the specification described in TABLE 1. In the diskette (A) according to this invention, the housing 23 was made of cold-rolled steel sheet of 0.1 mm thick and its saturation magnetic flux density Bs: 1.5 T, having two half-round openings of 32 mm in diameter and a magnetic shield bridge of 9 mm wide between them. A plastics-made back end 12 of the diskette case having an opening 121 of 29.2 mm in diameter at the center of the back end and a magnetic shield ring (outside diameter: 29.0 mm, inside diameter: 25.0 mm) made of cold-rolled steel sheet of 0.1 mm thick and of its saturation magnetic flux density Bs: 1.5 T and pasted on the side end of the permanent magnet adjacent to the back end by epoxy adhesive were used. The height difference between the back end 12 surface of the diskette case and the shield ring pasted on the permanent magnet side end was adjusted within 0.1 mm.

The housing construction of the diskette (B) according to this invention was made the same as the diskette (A) and the back end 12 of the diskette case was made of cold-rolled steel sheet of 0.1 mm thick, having an opening 121 of 26.0 mm in diameter at the center of the back end, so that the outer circumference of the permanent magnet overlapped the portion adjacent to the opening 121 of the back end 12. The height gap between the permanent magnet side end and the back end 12 was prepared to be 0.3 mm but no shield ring was pasted on the side end of the permanent magnet adjacent to the back end.

Next, as a comparison diskette (C), a housing was built of non-magnetic plastics and had no magnetic shield. The diskette (C) was the same as the diskette (A) with exception for these. A comparison diskette (D) was prepared the same as the diskette (A) with exception that the housing did not have half-round openings and was shielded on the whole surface. The magnetic shield constructions of these diskettes are shown in TABLE 2 collectively.

TABLE 1

| Item | Specification |
| --- | --- |
| Diskette size | The same as 3.5" floppy disk |
| Size of stator yoke | Outside dimension 36 mm × 79 mm × inside dia. 29.4 mm × thick. 0.8 mm |
| Rotor size | Outside dia. 29.0 mm × inside dia. 25 mm (hub dia.) × thick. 2.0 mm |
| Permanent magnet | Sintered NdFeB radial anisotropic permanent magnet (Br: 1.24 T, bHc: 9.3 × $10^{-2}$ kA/m) |
| No. of rotor poles | 16 poles |
| Stator material | Cold-rolled steel sheet SPCC (Saturation mag. flux density Bs: 1.5 T) |
| No. of stator poles | 16 poles (11 poles as five poles replaced with soft magnetic pieces) |
| Stator winding | No. of turns: 600 turns/pole Wire dia.: 0.16 mm Coil resistance: 65 ohms (for 11 poles) Series connection |
| Inner yoke of stator | Thick. of enclosed-slot bridging part: 0.5 mm Width of mag. pole teeth: 3.5 mm Thick. of mag. pole teeth: 0.8 mm Angle of tapers: 180 degrees |
| Magnetic gap | 0.2 mm (on one side) |
| Revolution | 300 rpm |

TABLE 2

| DISKETTE | DISKETTE CASE | HOUSING | SHIELD RING |
| --- | --- | --- | --- |
| A | PLASTICS | MAG. MAT. W/BRIDGE AND OPENINGS | WITH |
| B | MAG. MAT. | MAG. MAT. W/BRIDGE AND OPENINGS | WITHOUT |
| C | PLASTICS | PLASTICS | WITH |
| D | PLASTICS | MAG. MAT. W/O OPENINGS | WITH |

TABLE 3

| Diskette | Output voltage (V0-p) | Leakage magnetic flux at magnetic stripe (Gauss) | External leakage magnetic flux (Gauss) |
| --- | --- | --- | --- |
| A (invention) | 4.2 | 8 | 300 |
| B (invention) | 4.1 | 8 | 80 |
| C (comparison) | 4.5 | 1000 | 300 |
| D (comparison) | 3.3 | 8 | 300 |

The results of the output voltages and the leakage magnetic fluxes measured are shown in TABLE 3. In the diskettes (A) and (B) of this invention, the leakage magnetic flux densities to the card space at the position where the magnetic stripe should be placed were less than 10 Gausses, like the diskette (D) using a housing of the whole shield plate, and had no affection to the magnetic stripe. In comparison with these, the diskette (C) having no shield housing leaked a great amount of magnetic flux to the card space. The output voltages of the diskettes (A) and (B) were only little lower than the diskette (C), in spite of the magnetic shield housing, and pretty higher than the diskette (D) having the whole shielded housing. In addition, the diskette (A) was 0.3 mm thinner than the diskette (B).

TABLE 3 also shows external leakage magnetic fluxes. In the diskettes (A), (C) and (D), with constructions that a shield ring is fixed on an end plate side of the permanent magnet, the external leakage magnetic fluxes are about 300 Gausses. The leakage flux is reduced to the amount which would not affect recorded information even if a memory card with a magnetic memory of relatively large coercive force (about 650 Oe) were contacted to the back end of the diskette, in comparison with the case a diskette case is made of plastics and a shield ring is not disposed on the magnet. In such a case, the external leakage was about 700 Gausses.

Experiment 2

Figure 11A:
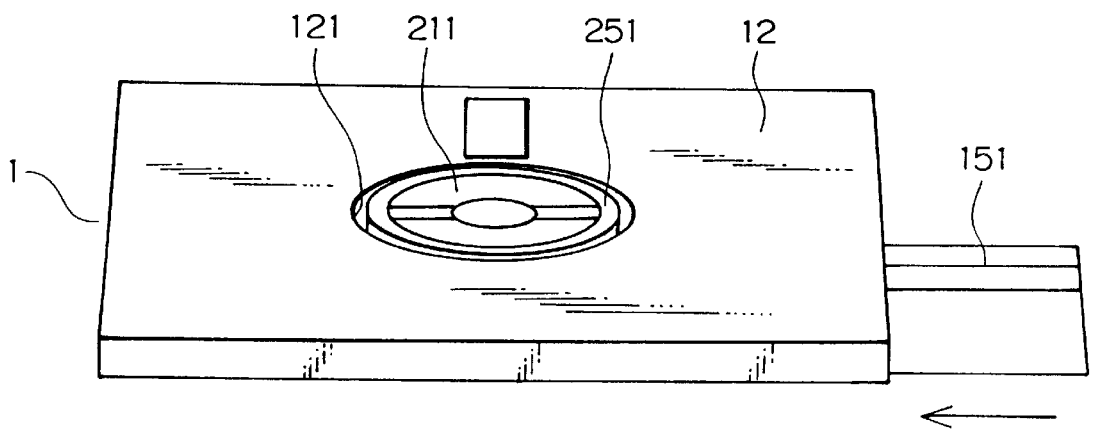
Figure 11B:
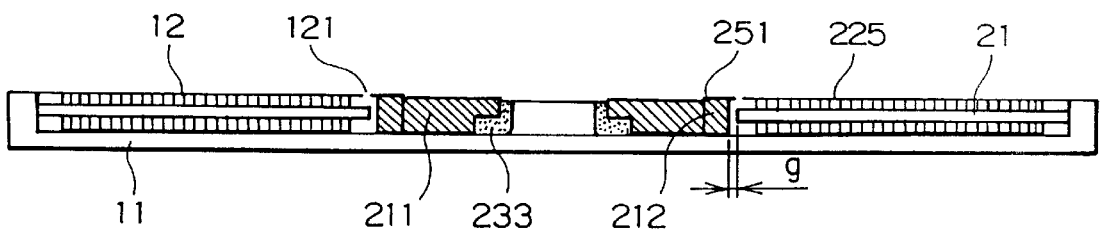
Figure 11C:
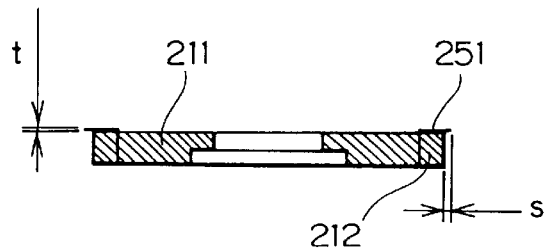

FIG. 11 shows still another embodiment of a diskette incorporating a permanent magnet generator according to this invention; FIG. 11A being a perspective view of the diskette, FIG. 11B a cross-sectional view of the whole diskette and FIG. 11C a partially enlarged cross-sectional view of a rotor in the diskette. In the above-mentioned embodiments, the magnetic shield ring had an outside diameter substantially equal to that of the ring permanent magnet The shield ring in EXPERIMENT 1 did not substantially affect a memory card with a magnetic memory of relatively large coercive force but did not have a sufficient shielding effect to a card with weak coercive force (e.g. about 300 Oe). So, in this embodiment a shield ring 251 has a diameter larger than the outside diameter of the ring permanent magnet 212 and overhangs out of the magnet. That is, as shown in FIGS. 11B and 1C, the shield ring 251 overhangs the magnetic gap g by the protrusion s from the outside diameter of the permanent magnet 212. The shield ring 251 is positioned with an air gap of about 0.5 mm with the inner circumference of the opening 121 of the back end 12 to oppose to and on a level with the inner edge of the opening 121. Other structures are the same as in the above embodiment, like numerals are used for like parts and explanation is omitted.

When a memory card with low coercive force is left on a diskette having a permanent magnet generator, the information stored in the memory card may be partially erased by external leakage magnetic flux from the diskette to deteriorate accuracy of information read-out. The present embodiment tried to eliminate the deterioration by protruding the magnetic shield ring 251 from the permanent magnet. On the other hand, an excessive protrusion may result in reduction of the generator output. So, the desirable protrusion of the shield ring should be studied. Also, the thickness of the magnetic shield ring tends to deteriorate the generator output as well as the protrusion. The dimension balance of the magnetic shield ring should be studied, taking account of these.

Figure 12:
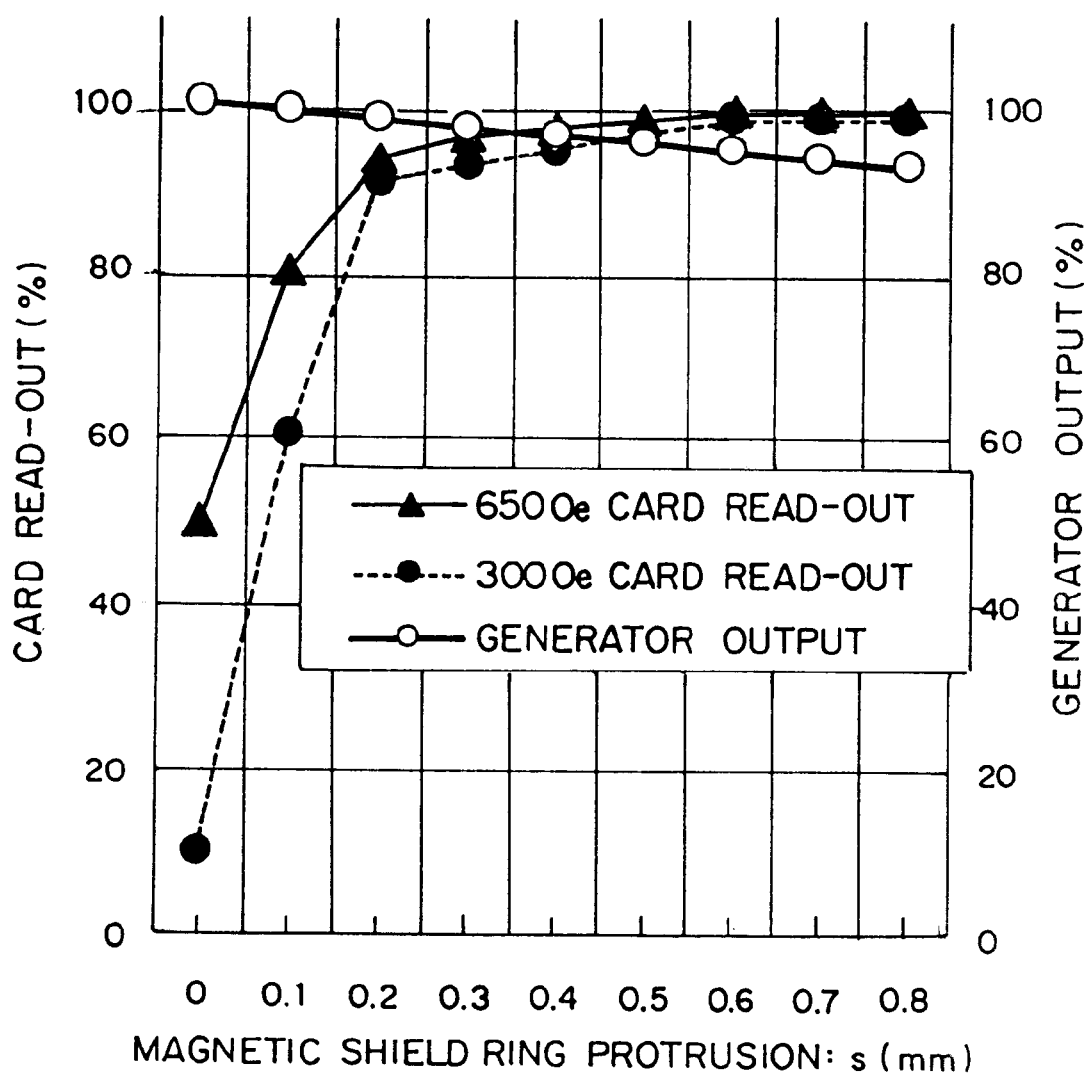
FIG. 12 is a graph showing card read-out data and generator outputs measured with protrusions of a magnetic shield ring as a parameter, fixing the magnetic shield ring thickness at 0.2 mm.
Figure 13:
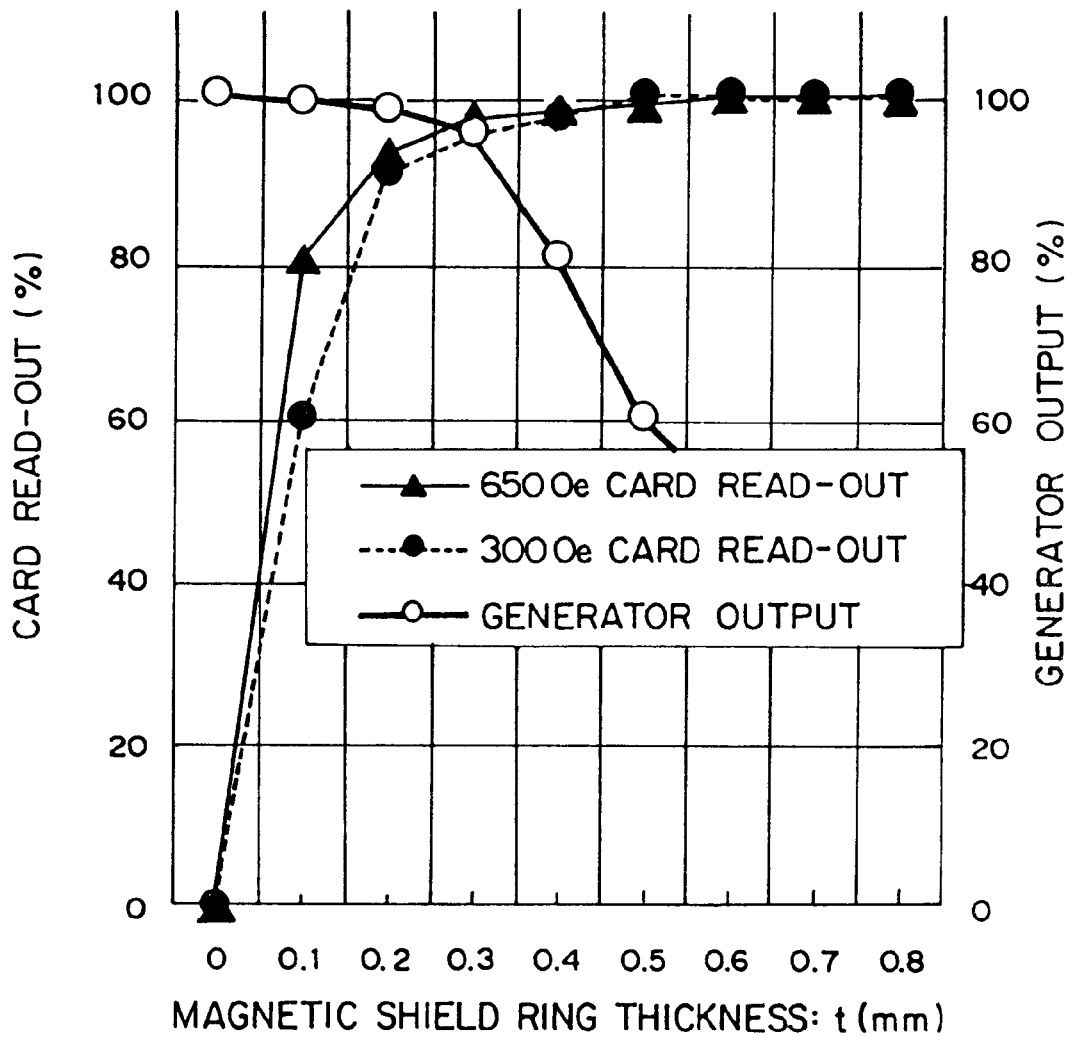
FIG. 13 is a graph showing card read-out data and generator outputs measured with thickness of a magnetic shield ring as a parameter, fixing the protrusion of the magnetic shield ring at 0.2 mm.

The experimental results are described below. Diskettes used in this EXPERIMENT were prepared based on the construction of the diskette (A) following the specification of TABLE 1, EXPERIMENT 1, with exception that the dimension of the magnetic shield ring was varied. The magnetic gap was changed to about 0.15 mm. In the experiment, using a low coercive force memory card (300 Oe), the changes in card read-out and generator output were studied with varying the protrusion s of the magnetic shield ring and then the change in card read-out was measured, varying the thickness t of the magnetic shield ring. FIGS. 12 and 13 are graphs showing the experimental results. FIG. 12 is results of card read-out (▲: coercive force 650 Oe, ●: 300 Oe) and generator output ratio (○) measured with the magnetic shield rings of a fixed thickness of 0.2 mm and of a variable protrusion s as a parameter. And FIG. 13 is a test result of card read-out (▲: coercive force 650 Oe, ●: 300 Oe) and generator output ratio (○) measured when the ring thickness t was changed as a parameter but the ring protrusion is fixed at 0.2 mm. The card read-out means remaining signal values in ratio which information is read out after a memory card storing 100% information is put on the diskette to partially deteriorate the stored information. And, the generator output ratio in FIG. 12 means the ratio of output voltage at a certain protrusion s of the shield ring to output voltage at zero protrusion regarded as 100%. The generator output ratio in FIG. 13 means the ratio of output voltage at a shield ring with a certain thickness t to output voltage at no shield ring (shield ring thickness t=0 mm) regarded as 100%.

First, it is apparent from FIG. 12 that the card read-out increases, when the protrusion s is increased, and reaches more than 60% at the protrusion more than 0.1 mm and maintains more than 90% at the protrusion more than 0.2 mm for the 300 Oe memory card. That is, the external leakage magnetic flux is almost suppressed when the protrusion becomes more than 0.2 mm. By contrast, for the relatively high coercive force card, a card read-out of more than 50% can be obtained even when the protrusion is 0 mm. The generator output is gradually decreasing with the protrusion increasing. The output more than 90% is obtained with the protrusion less than 1.0 mm and the output was more than 95% with 0.6 mm protrusion. This is thought to be because almost all of the leakage magnetic flux leaks outside with the protrusion less than 0.1 mm but, when the protrusion is about 0.2 mm to almost cover the magnetic gap, the leakage magnetic flux is shielded by the protrusion and does not leak outside. But, a longer protrusion takes little effect to the external leakage flux. On the contrary, the magnetic flux short-circuited by the shield ring is increasing to reduce the generator output. From these results, the protrusion s should be 0 to 1.0 mm, preferably 0 to 0.6 mm, for a relatively high coercive force card, since the card is not affected by the external leakage magnetic flux even when the protrusion is 0 mm. But, for a relatively low coercive force card, there is a range of the protrusion s of the magnetic shield ring which covers the magnetic gap and extends twice the gap to balance the external leakage magnetic flux with the generator output. The protrusion range satisifying both of them is about 0.1 to about 1.0 mm, preferably 0.2 to 0.6 mm.

Next, FIG. 13 shows influence of the shield ring thickness on the external leakage magnetic flux and the generator output. It is apparent from the figure that the card read-out increases when the thickness increases and that the card read-out for a 300 Oe memory card reaches more than 60% with more than 0.1 mm thick and can be maintained at more than 90% with more than about 0.2 mm thick. And the card read-out of more than 80% can be obtained with more than 0.1 mm thick for a 650 Oe card. By contrast, the generator output decreases when the thickness increases, below 90% with more than 0.4 mm and below 60% with more than 0.5 mm. That is, the thicker shield ring can more prevent the external leakage magnetic flux, but too thick a ring tends to increase short-circuiting flux and to reduce rapidly the generator output. From the above, there is a range of the thickness of the magnetic shield ring, satisfying both the external leakage magnetic flux and the generator output and that is about 0.1 to about 0.5 mm, preferably 0.2 to 0.4 mm. As explained before, it is essential to thin the generator thickness. So, the thickness should be decided at a thinner value in the range of from 0.1 to 0.5 mm, preferably 0.1 to 0.3 mm first, and then the protrusion should be decided at 0 to 0.6 mm for a memory card of relatively high coercive force (more than 650 Oe) and at 0.1 to 1.0 mm, preferably 0.2 to 0.6 mm for a low coercive force (around 300 Oe).

The material of the magnetic shield ring is desirably soft magnetic material having permeability more than 50 and high saturation magnetic flux density in view of its function but practically a normal thin steel sheet, taking account of cost and workability.

In the embodiment shown in FIG. 11, the magnetic shield ring 251 is made of cold-rolled steel sheet, taking account of the reduction of the external leakage flux, the thickness of the diskette, the maintaining of the generator output and the ease of assembling and the cost of the generator, and the thickness t, the protrusion s and the magnetic gap g are set respectively at 0.2 mm, 0.3 mm and 0.15 mm. When the experimental data in the embodiment corresponding to TABLE 3 was measured, the leakage magnetic flux at the magnetic stripe was 10 Gausses and the external leakage magnetic flux was 150 Gausses, that is, at a level giving no affection outside. And a high generator output of 20 mW was obtained.

As described above in detail, the diskette adjoiningly having a permanent magnet generator and a space for inserting a memory card according to the present invention substantially eliminates the affection of the leakage magnetic flux from the generator permanent magnet to the memory card, reduces the short-circuit of the magnetic flux from the permanent magnet and accomplishes a high generator output. The diskette of this invention, also, is so tough that the generator rotor is supported by a metal, such as a magnetic shield plate.

In a diskette incorporating a permanent magnet generator according to this invention, the external leakage magnetic flux from the generator permanent magnet is substantially eliminated, the high generator output can be maintained and the diskette thickness can be reduced.

What is claimed is:

1. A diskette comprising:
    a diskette case with a memory card space adapted to accommodate in a non-rotatable fashion a memory card having a magnetic stripe for inputting information to and outputting information from the memory card, such that the magnetic stripe is located in a predetermined position of the memory card space;
    a permanent magnet generator positioned in the diskette case and located adjacent to the memory card space, the permanent magnet generator including
        (1) a rotor having a ring permanent magnet with a plurality of rotor magnetic poles arranged on a circumferential surface thereof, the ring permanent magnet rotatable together with a hub of the diskette, and
        (2) a stator facing the rotor magnetic poles via a magnetic gap; and
    a partition disposed between the memory card space and the permanent magnet generator, the partition having a magnetic shield interposed between the rotor and the predetermined position of the memory card space and having no magnetic shield confronting side end portions of the rotor that are not superposed over the predetermined position of the memory card space.

2. A diskette as set forth in claim 1,
    wherein the partition is made of a magnetic shield material and has an opening confronting the side end portions of the rotor.

3. A diskette as set forth in claim 1,
    wherein the partition is made of a non-magnetic material.

4. A diskette as set forth in claim 1,
    wherein the permanent magnet generator is positioned in a housing, which is in turn positioned in the diskette case, and one wall of the housing constitutes the partition.

5. A diskette as set forth in claim 4,
    wherein the housing is made of a magnetic shield material, and has an opening confronting the side end portions of the rotor.

6. A diskette as set forth in claim 5,
    wherein the rotor is axially supported on the magnetic shield and superposed over the predetermined position of the memory card.

7. A diskette as set forth in claim 4,
    wherein the housing is made of a non-magnetic material, and has an opening confronting the side end portions of the rotor.

8. A diskette as set forth in claim 7,
    wherein the rotor is axially supported on the magnetic shield and superposed over the predetermined position of the memory card.

9. A diskette as set forth in claim 1,
    wherein the rotor is positioned inside of and adjacent to an end plate of the diskette case, and
    wherein the ring permanent magnet has coaxially a magnetic shield ring having an outside diameter equal to or more than an outside diameter of the ring permanent magnet on a side end of the ring permanent magnet that is adjacent to the end plate of the diskette case.

10. A diskette as set forth in claim 9,
    wherein the end plate of the diskette case has an opening that is larger than the magnetic shield ring approximately at the center of the end plate, and
    wherein the magnetic shield ring is positioned in the opening and substantially level with the end plate.

11. A diskette as set forth in claim 9,
    wherein the magnetic shield ring protrudes from a circumference of the ring permanent magnet 0.1 to 1.0 mm.

12. A diskette as set forth in claim 9,
    wherein a thickness of the magnetic shield ring is 0.1 to 0.5 mm.

13. A diskette as set forth in claim 9,
    wherein the magnetic shield ring is of permeability more than 50.

14. A diskette incorporating a permanent magnet generator comprising;
    a diskette case,
    a memory card space disposed in the diskette case and for insertion of a memory card having a magnetic stripe for input/output to and/or from the memory card,
    a permanent magnet generator positioned adjoining the memory card space in the diskette case, the permanent magnet generator comprising
        a permanent magnet rotor having a ring permanent magnet with a plurality of magnetic poles arranged on the circumferential surface of the magnet and rotatable together with a hub of the diskette,
        a stator facing the rotor magnetic poles via a magnetic gap, and
        a housing surrounding the stator, the housing having a magnetic shield at least at a housing wall between the permanent magnet generator and the memory card space, and the magnetic shield having an opening at a side of the rotor and having a magnetic shield bridge crossing the opening at the side of the magnetic stripe of the memory card that should be inserted, in order to cover the magnetic stripe.

15. A diskette as set forth in claim 14, wherein the rotor is axially supported on the magnetic shield bridge.

16. A diskette as set forth in claim 14, wherein the permanent magnet rotor is positioned inside of and adjacent to one end plate of the diskette case, and wherein the ring permanent magnet has coaxially a magnetic shield ring having an outside diameter equal to or more than the outside diameter of the ring permanent magnet on a side end of the permanent magnet which side end is adjacent to the end plate of the diskette case.

17. A diskette as set forth in claim 16, wherein the end plate of the diskette case has an opening that is larger than the magnetic shield ring approximately at the center of the end plate, and wherein the magnetic shield ring is positioned in the opening and substantially level with the end plate.

18. A diskette as set forth in claim 16, wherein the protrusion of the magnetic shield ring from the circumference of the ring permanent magnet is 0.1 to 1.0 mm.

19. A diskette as set forth in claim 16, wherein the thickness of the magnetic shield ring is 0.1 to 0.5 mm.

20. A diskette as set forth in claim 16, wherein the magnetic shield ring is of permeability more than 50.

21. A diskette comprising:

a diskette case; and a permanent magnet generator positioned in the diskette case, the permanent magnet generator including
  (1) a rotor positioned inside of and adjacent to an end plate of the diskette case, the rotor having a ring permanent magnet with a plurality of rotor magnetic poles arranged on a circumferential surface thereof, the ring permanent magnet rotatable together with a hub of the diskette, the ring permanent magnet having coaxially a magnetic shield ring having an outside diameter equal to or greater than an outside diameter of the ring permanent magnet on a side end of the ring permanent magnet that is adjacent to the end plate of the diskette case, and
  (2) a stator facing the rotor magnetic poles via a magnetic gap.

22. A diskette as set forth in claim 21, wherein the end plate of the diskette case has an opening that is larger than the magnetic shield ring approximately at a center of the end plate, and wherein the magnetic shield ring is positioned in the opening and substantially level with the end plate.

23. A diskette as set forth in claim 21, wherein the magnetic shield ring protrudes from a circumference of the ring permanent magnet 0.1 to 1.0 mm.

24. A diskette as set forth in claim 21, wherein a thickness of the magnetic shield ring is 0.1 to 0.5 mm.

25. A diskette as set forth in claim 21, wherein the magnetic shield ring is of permeability more than 50.

* * * * *